United States Patent [19]
Nykerk et al.

[11] Patent Number: 5,217,280
[45] Date of Patent: Jun. 8, 1993

[54] PRESSURE SENSITIVE SIGNAL DEVICE FOR VEHICLE BRAKE PEDAL

[75] Inventors: Todd M. Nykerk; Ronald D. Ingraham; Peter H. Strom, all of Reed City, Mich.

[73] Assignee: Nartron Corporation, Reed City, Mich.

[21] Appl. No.: 559,905

[22] Filed: Jul. 30, 1990

Related U.S. Application Data

[63] Continuation-in-part of Ser. No. 375,946, Jul. 6, 1989, Pat. No. 5,010,972, and a continuation-in-part of Ser. No. 376,642, Jul. 6, 1989, Pat. No. 4,978,177.

[51] Int. Cl.$^5$ .............................................. B60T 13/70
[52] U.S. Cl. ................................. 303/3; 73/862.627; 74/512; 74/514; 188/158; 303/15; 303/20; 303/50; 338/108
[58] Field of Search ...................... 303/3, 50–56, 303/15, 20, 91, 101, 100; 188/158, 159, 1.11; 338/108, 153, 47, 114; 340/479, 480, 489, 487; 60/545; 91/361; 200/61.89, 86.5, 553; 74/514, 512; 73/862.65, 862.64; 307/10, 8; 250/215, 221, 229; 180/197, 178

[56] References Cited

U.S. PATENT DOCUMENTS

| | | | |
|---|---|---|---|
| 2,091,086 | 8/1937 | Taylor | 177/337 |
| 2,232,447 | 2/1941 | Griffith | 200/59 |
| 2,276,028 | 3/1942 | Dick | 200/59 |
| 2,445,660 | 7/1948 | Brustle | 201/50 |
| 2,454,291 | 11/1948 | Penrose | 201/51 |
| 2,530,131 | 11/1950 | Roters | 318/261 |
| 2,674,669 | 4/1954 | Leedam | 200/86.5 |
| 2,832,863 | 4/1958 | Quimby | 200/61.89 |
| 3,125,739 | 3/1964 | Deibel et al. | 338/99 |
| 3,171,917 | 3/1965 | Leichsenring | 200/86.5 |
| 3,219,775 | 11/1965 | Carpenter | 200/61.89 |
| 3,390,243 | 6/1968 | Obermann | 200/166 |
| 3,398,992 | 8/1968 | Littmann | 303/20 |
| 3,419,115 | 12/1968 | Glenn | 192/2 |
| 3,439,323 | 4/1969 | Kersting | 340/52 |
| 3,574,414 | 4/1971 | Jacob | 303/7 |
| 3,581,028 | 5/1971 | Valboua | 200/38 |
| 3,622,723 | 11/1971 | Fischel | 200/86 R |
| 3,711,162 | 1/1973 | Steinbrenner et al. | 303/21 R |
| 3,724,913 | 4/1973 | Levy | 250/215 X |
| 3,766,342 | 10/1973 | Stadelmann | 200/61.89 |
| 3,802,745 | 4/1974 | Strifler et al. | 303/3 |
| 3,814,484 | 6/1974 | Matthews et al. | 303/20 |
| 3,823,985 | 7/1974 | Hubbard | 303/7 |
| 3,827,758 | 8/1974 | Hansen | 303/3 |
| 3,838,888 | 10/1974 | Gynn | 303/20 |
| 3,840,276 | 10/1974 | Jubenville | 303/20 |
| 3,882,442 | 5/1975 | Hubbard | 338/41 |
| 3,909,075 | 9/1975 | Pittet, Jr. et al. | 303/24 C |
| 3,911,394 | 10/1975 | Shames | 340/71 |
| 3,953,084 | 4/1976 | Pittet, Jr. et al. | 303/24 R |
| 3,967,863 | 7/1976 | Tomecek et al. | 303/24 C |
| 3,981,542 | 9/1976 | Abrams et al. | 303/20 |
| 3,981,544 | 9/1976 | Tomecek et al. | 303/21 AF |

(List continued on next page.)

FOREIGN PATENT DOCUMENTS 3443687 6/1985 Fed. Rep. of Germany .

Primary Examiner—Douglas C. Butler
Attorney, Agent, or Firm—Price, Heneveld, Cooper, DeWitt & Litton

[57] ABSTRACT

A brake pedal actuation sensor includes an optical coupler. In a preferred embodiment: the optical sensor is carried by a housing; a shutter is provided to interrupt the optical coupling according to the distance between the housing and a bearing; the shutter is carried by the bearing; and the distance between the housing and the bearing is dependent upon the force applied to the brake. Additionally, a circuit responsive to an output of the optical coupler is provided for generating an electrical output signal indicating brake pedal actuation.

38 Claims, 4 Drawing Sheets

U.S. PATENT DOCUMENTS

| | | | |
|---|---|---|---|
| 4,005,759 | 1/1977 | Farr | 180/65 R |
| 4,030,756 | 6/1977 | Eden | 303/24 A |
| 4,145,317 | 5/1979 | Sado et al. | 252/512 |
| 4,152,304 | 5/1979 | Tadewald | 252/506 |
| 4,163,204 | 7/1979 | Sado et al. | 338/114 |
| 4,297,550 | 10/1981 | Leighton | 200/61.89 |
| 4,404,439 | 9/1983 | Leighton | 200/61.89 |
| 4,419,653 | 12/1983 | Waigand | 338/114 |
| 4,441,097 | 4/1984 | Anderson | 340/365 A |
| 4,560,913 | 12/1985 | Min . | |
| 4,572,030 | 2/1986 | Sakurai et al. | 250/229 X |
| 4,602,702 | 7/1986 | Ohta et al. . | |
| 4,639,710 | 1/1987 | McMillan et al. | 338/108 |
| 4,658,939 | 4/1987 | Kircher et al. | 188/156 |
| 4,721,344 | 1/1988 | Frait et al. | 303/20 |
| 4,784,442 | 11/1988 | Petersen . | |
| 4,802,562 | 2/1989 | Kuroyanagi et al. | 180/197 X |
| 4,818,036 | 4/1989 | Reinecke | 303/20 X |
| 4,888,997 | 12/1989 | Eckert et al. | 74/512 X |
| 4,978,177 | 12/1990 | Ingraham et al. | 303/50 X |
| 5,010,972 | 7/1990 | Ingraham et al. | 180/178 |
| 5,137,338 | 8/1992 | Ingraham | 303/3 |

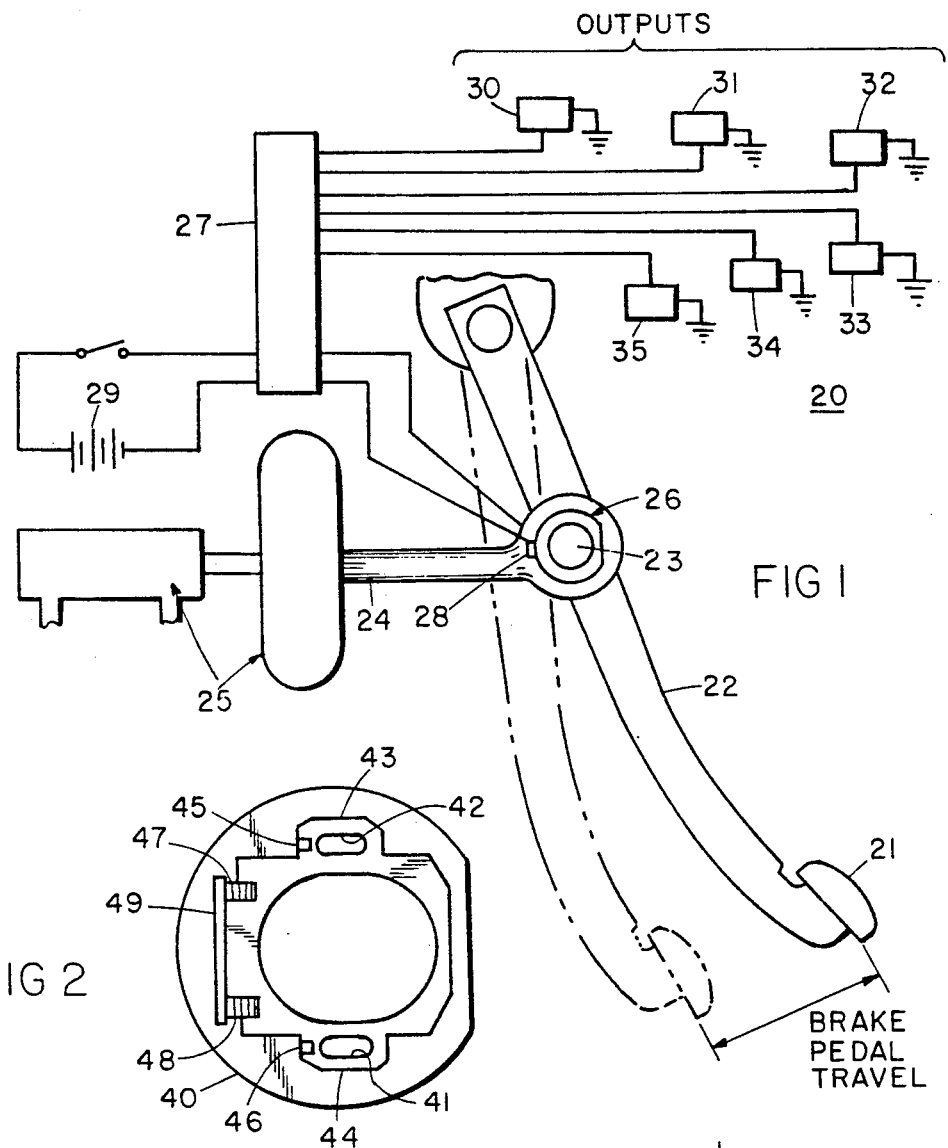
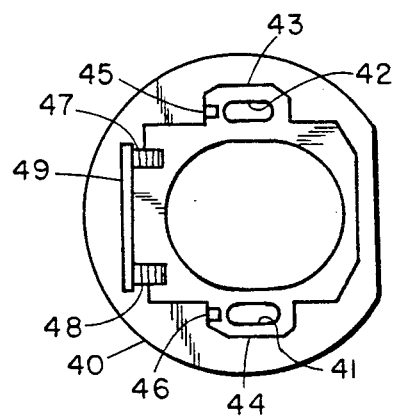
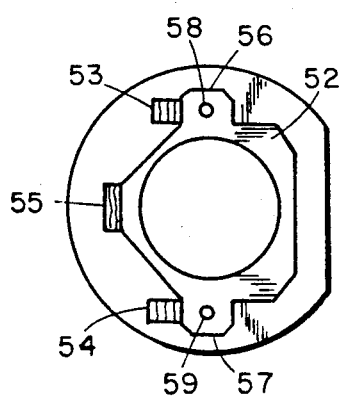
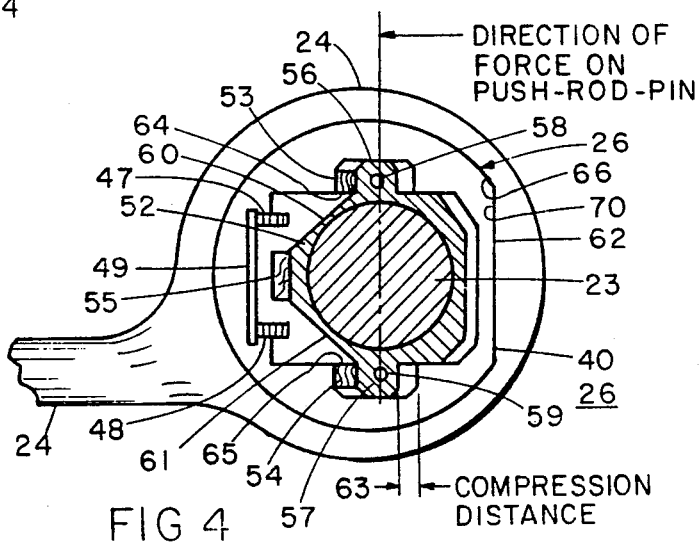

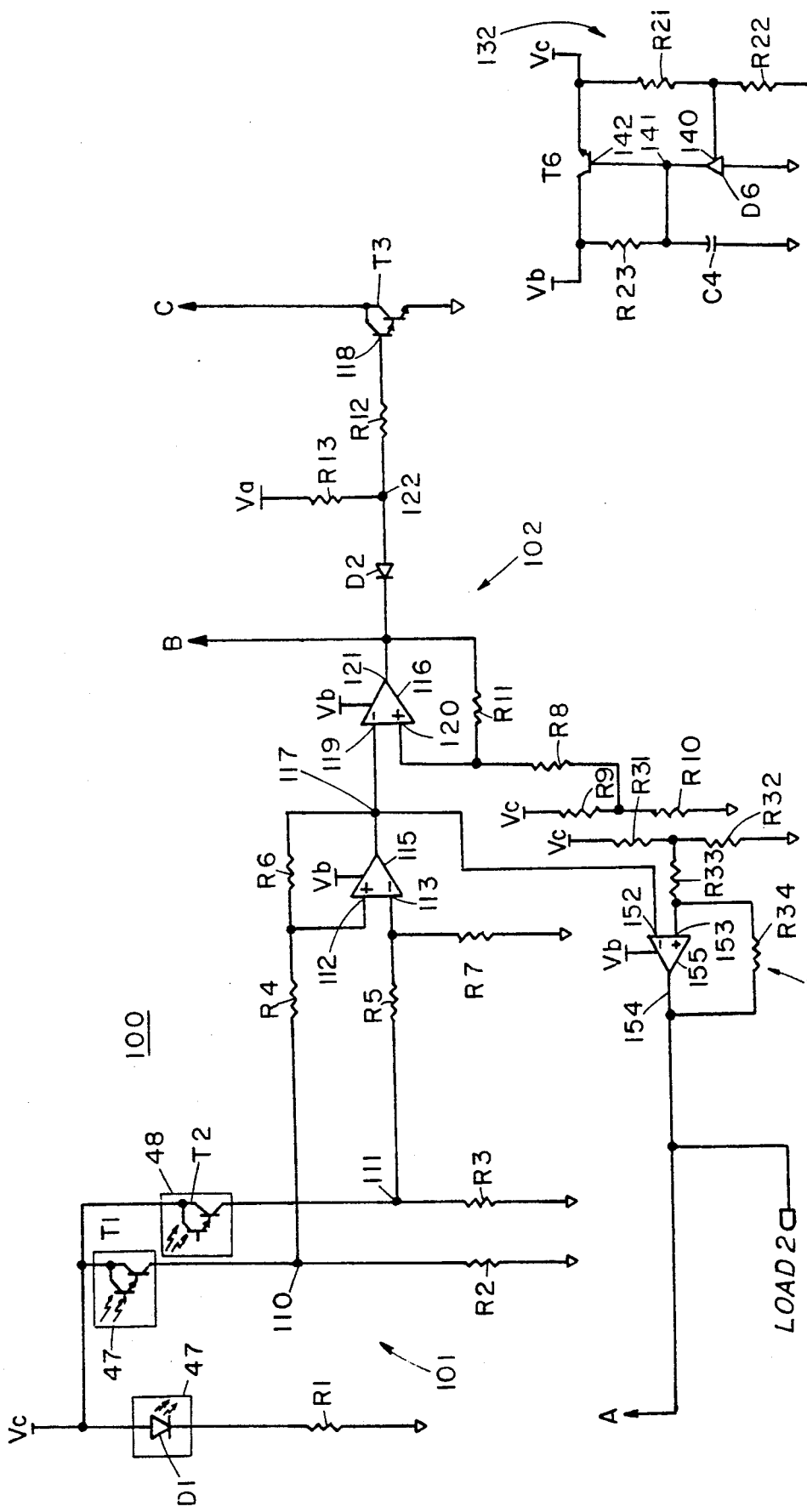

PRESSURE SENSITIVE SIGNAL DEVICE FOR VEHICLE BRAKE PEDAL

RELATED APPLICATIONS

This application is a continuation-in-part of application Ser. No. 07/375,946, filed July 6, 1989, now U.S. Pat. No. 5,010,972 issued to Ingraham et al. on Apr. 30, 1991, and entitled COMBINATION VEHICULAR BRAKING AND ACCESSORY CONTROL SYSTEM and application Ser. No. 07/376,642, filed on July 6, 1989, now U.S. Pat. No. 4,978,177 issued to Ingraham et al. on Dec. 18, 1990, and entitled SIGNAL MECHANISM RESPONSIVE TO FORCE APPLIED TO VEHICULAR BRAKE PEDAL AND THE LIKE.

BACKGROUND OF THE INVENTION

The present invention pertains to a force sensitive brake pedal assembly and in particular to a signal generating circuit which provides an electrical signal output according to the force applied to the brake pedal.

Vehicle braking systems employ switches operative to provide an indication of brake pedal depression. These switches are used to activate vehicle brake lights, for example. One type of switch is a mechanical switch actuated whenever the brake pedal is depressed. Another type of switch is actuated by pressure changes in the hydraulic fluid of the vehicle's hydraulic brake system. Another type of mechanical switch includes an operative connection in the mechanical linkage of the vehicle's brake system.

Such prior systems have several disadvantages. Fluid pressure switches occasionally cause leakage in the area where the pressure sensitive switch interfaces with the hydraulic system. Mechanical switches connected in the mechanical linkage increase the magnitude of force required to actuate the brake pedal. Another disadvantage of the mechanical switch systems is they require adjustment when installed and during the life of the system because of linkage wear. Furthermore, a slight force applied to a vehicle brake pedal by the driver through inadvertent resting of the driver's foot on the brake pedal, may cause the associated switch to be actuated even though the brake system has not been energized. As a result, a false indication of braking is provided by the vehicle's brake lights. Additionally, the prior art switches are generally slow acting and switch failure can occur due to electrical contact erosion Other prior systems include a force sensitive resistor having a variable resistance dependent upon the force applied to the brake pedal. Circuitry responsive t the variable resistance provides an output, or outputs, according to the magnitude of the force applied to the brake. Although the force sensitive resistor an its associated circuitry solve many of the problems of the prior art, the variable resistor does not necessarily maintain constant characteristics over the entire temperature range to which an automobile is typically exposed.

SUMMARY OF THE PRESENT INVENTION

The present invention is embodied in a system having an optical coupler to detect brake pedal actuation. Systems embodying the invention include a shutter positioned to interfere with the light transmission of the optical coupler. Relative positioning of the shutter and optical coupler on separate mountings allows the force applied to the brake pedal to be translated into an electrical signal dependent thereon. An embodiment of the invention includes a bearing which carries the shutter and a housing which carries the optical coupler.

The invention has several advantages. First, the optical coupling requires neither a mechanical switch nor a pressure sensitive switch. Additionally, the optical coupler and its associated circuitry provide an indication of brake actuation substantially independent of temperature. These and other objects, advantages, and features of this invention will become apparent upon review of the following specification in combination with the drawings.

BRIEF DESCRIPTION OF THE DRAWINGS

FIG. 1 is a diagram of a brake system according to the invention;

FIG. 2 is a side view of a sensor housing;

FIG. 3 is a side elevation view of one embodiment of a sensor bearing;

FIG. 4 is a section side elevation view of a sensor assembly mounted to a brake system with a portion of the sensor assembly removed for clarity;

FIG. 9A, 9B, and 9C are schematic diagrams illustrating a circuit for providing electric signal outputs.

DETAILED DESCRIPTION OF THE PREFERRED EMBODIMENT

Figure 5:
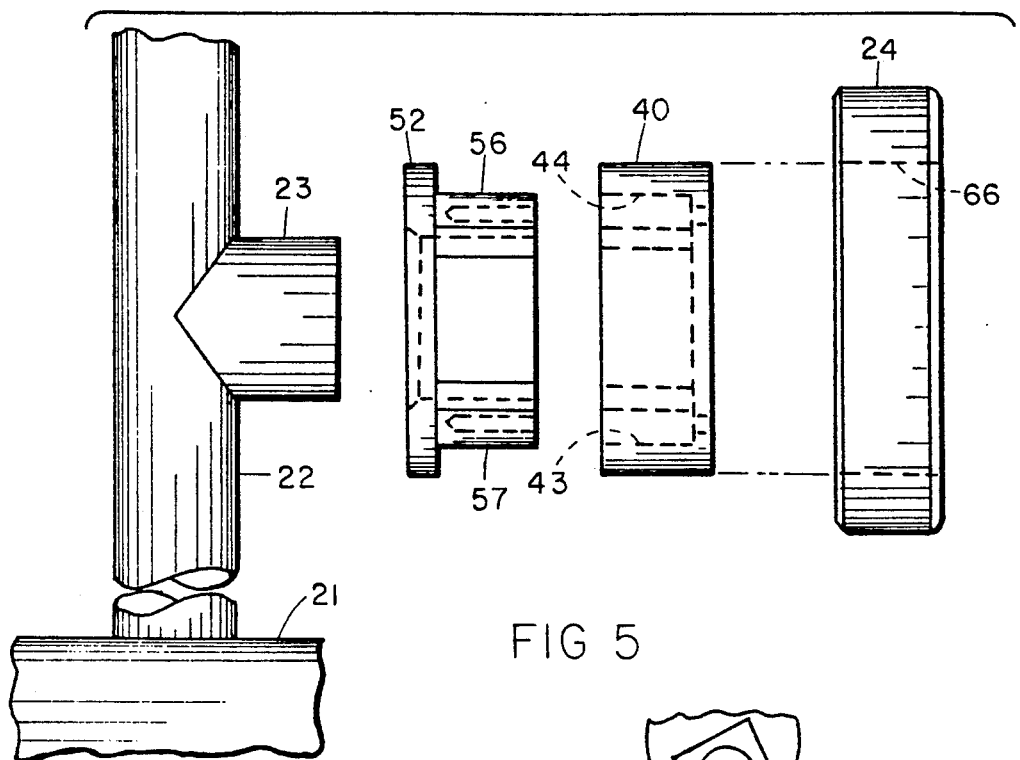
FIG. 5 is front view of a push-rod pin, a sensor bearing, a sensor housing, and a push-rod.

Referring now specifically to drawings, and the illustrative embodiments depicted therein, a vehicle brake system 20 is illustrated in FIG. 1 as including a brake pedal 21 carried by a brake pedal arm 22. A push-rod pin 23 connects brake pedal arm 22 to a push-rod 24. Push-rod 24 in turn transmits force from brake-pedal arm 22 to the vehicle's braking mechanics 25 in order to actuate braking.

A sensor assembly 26 is mounted between push-rod 24 and push-rod pin 23 in order to provide an electrical indication of brake pedal actuation. The sensor assembly is connected with output module 27 via electrical connector 28. The output module is connected to the vehicle's battery 29 as well as to various output devices designated 30 through 35. Output devices 30 through 35 may include, but are not limited to: brake actuation indicators (e.g., brake lights); a vehicle speed control; a device associated with automatic power transmissions which prevents the torque converter from locking up; a device for preventing unintentional vehicle acceleration; an interlock mechanism which requires brake actuation prior to movement of the transmission selector lever from "park" or "neutral" position to any other operating condition; an anti-dive type system intended to prevent excessive downward movement of the front of the vehicle upon vehicle braking; and anti-lock braking devices.

Sensor assembly 26 includes a housing 40 (FIG. 2) provided with slotted screw holes 41 and 42 in bearing ear slots 43 and 44. The housing further includes compression stops 45 and 46. The housing carries an optical coupling assembly, including an infrared emitter 47, having a base-line internal infrared detector, and an infrared detector 48, on printed circuit board 49. Sensor assembly 26 further includes a bearing 52 (FIG. 3). Bearing 52 including pads 53 and 54, as well as a shutter 55, positioned on a common base. In a preferred embodiment, pads 53 and 54 are made from a silicone made from commercially available s2097 and t350. However, any resilient material may be used which satisfactorily resists compression. Additionally, bearing ears 56 and 57 include screw holes 58 and 59.

The operation of sensor assembly 26 will be described with reference to the FIGS. 4 and 5. Bearing 52 (FIG. 4) is carried by push-rod pin 23. Housing 40 includes a flat side 62 which is keyed to fit with a flat side 70 of a push-rod hole 66. Push-rod hole 66 is made large enough to receive sensor assembly 26 between push-rod pin 23 and push-rod hole 66. Upon assembly (FIG. 5), bearing 52 fits snugly on push-rod pin 23, bearing ears 56 and 57 fit tightly within bearing ear slots 43 and 44, and the housing fits snugly within push-rod hole 66. Furthermore, the housing and the bearing are held together by screws (not shown). Screws are inserted through holes 41 and 42 in housing 40 and are received by threaded screw holes 58 and 59 in bearing 52. Slotted screw holes 41 and 42 (FIG. 2) allow the housing to slide around the screws which are secured in the bearing.

When force is applied to brake pedal 21, push-rod pin 23 carries bearing 52 in the direction indicated in FIG. 4. Movement of bearing 52 in turn causes compression of pads 53 and 54 in proportion to the force applied to the brake pedal. A compression distance 63 is thereby dependent on the magnitude of the force applied to the brake pedal. Movement of bearing 52 moves shutter 55 in to and out of the light path between infrared emitter 47 and infrared detector 48. In this manner, the shutter interferes with the transmission of light, or optical coupling, between infrared emitter 47 and infrared detector 48. The amount of interference caused by the shutter is directly related to the compression distance. In this embodiment, the smallest amount of interference with the transmission of light results when no force is applied to the brake pedal. While pad compression is taking place, housing 40 pushes push-rod 24 to activate automotive braking mechanics 25 (FIG. 1).

Figures 6, 7:
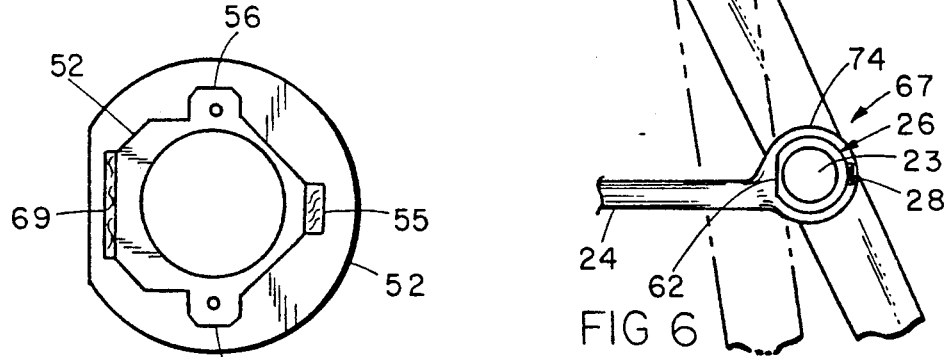
FIG. 6 is a side elevation view an alternate embodiment of a sensor assembly illustrated mounted to a brake pedal.
FIG. 7 is a side elevation view of a sensor bearing used in FIG. 6.
Figure 8:
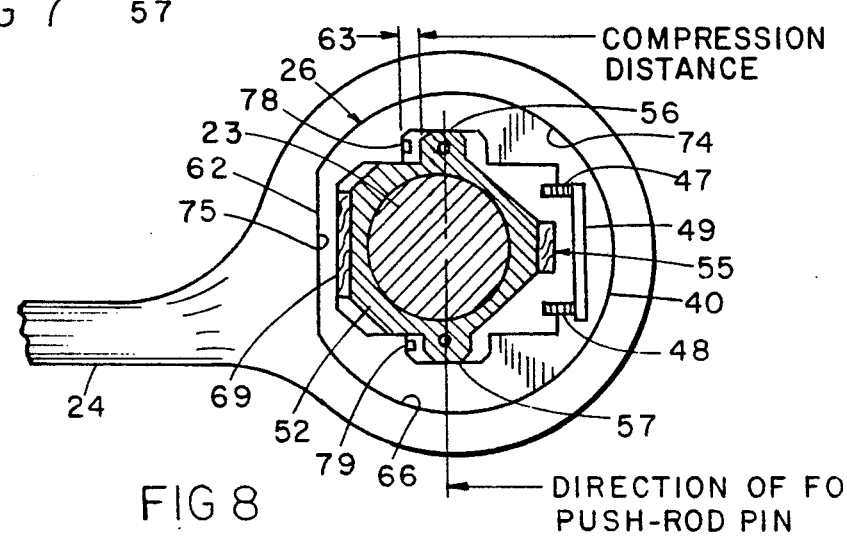
FIG. 8 is a sectional side view of the alternate embodiment of FIGS. 6 and 7 illustrated as a sensor assembly mounted to a brake system with a portion of the sensor assembly removed for clarity.

A second embodiment 67 of sensor assembly 26 is illustrated in FIGS. 6 through 8. In this embodiment, the sensor assembly is reversed with respect to the direction of application of force applied to bearing 52. Thus, when placed within push-rod hole 74, flat side 62 of housing 40 and flat side 75 of push-rod hole 66 are reversed with respect to flat sides 62 and 70 of the embodiment of FIGS. 2 through 4. Housing 40 includes stops 78 and 79 (FIG. 8) which limit the relative movement between housing 40 and bearing 52. Bearing 52 (FIG. 7) includes a single compression pad 69 which is used in place of the two compression pads 53 and 54 of the embodiment illustrated in FIGS. 2 through 4. Single compression pad 69 is on the opposite side of bearing 52 from shutter 55. Compression pad pad 69 also has a larger pad area as compared with the two pads 53 and 54 of the first embodiment. By mounting compression pad 69 opposite shutter 55, as shown in FIG. 8, shear forces experienced by the two pads of the first embodiment are avoided.

As seen in FIG. 8, force applied to brake pedal 21 (FIG. 1) causes bearing 52 to move toward flat end 62 of housing 40 against the force produced from the compression of pad 69. Accordingly, as force is applied to the brake pedal, shutter 55 (FIG. 8) moves out of the light path between infrared emitter 47 and external infrared detector 48. Accordingly, in the embodiment of FIGS. 6 through 8, when no force is applied to brake pedal 21, shutter 55 completely blocks the infrared light path between emitter 47 and detector 48. As force is increased, the shutter moves out of the infrared light path.

A circuit 100 (FIGS. 9A and 9B) generally includes a sensor 101 (FIG. 9a), a controller 102, a power supply 103 (FIG. 9B), a voltage doubler 104, a driver 105, and an output circuit 106. Circuit 100 will be described in more detail hereinafter.

Sensor 101 of circuit 100 includes infrared emitter and detector 47 (FIG. 9A) and infrared detector 48. Infrared emitter and detector 47 includes an infrared emitter D1 electrically connected in series with a resistor R1 between a supply voltage Vc and signal ground, and an infrared detector T1 connected in series with a resistor R2 between supply voltage Vc and signal ground. Infrared detector 48 includes a detector T2 connected in series with a resistor R3 between supply voltage Vc and signal ground. Infrared detectors T1 and T2 are Darlington transistors. Detector T1 is optically coupled to emitter D1 to provide a reference potential dependent upon the ambient temperature within sensor assembly 26 (FIG. 4). Detector T2 (FIG. 9A) is optically coupled to emitter D1 to provide an output signal dependant upon the extent to which shutter 55 (FIG. 4) interferes with the light path between emitter D1 (FIG. 9A) and detector T2 (FIG. 4).

Control circuit 102 includes a differential amplifier 115 and a comparator 116. An output 110 of infrared detector T1 is provided through a resistor R4 to a non-inverting input 112 of amplifier 115. An output 111 of infrared detector T2 is provided through a resistor R5 to an inverting input 113 of amplifier 115. An output 117 of amplifier 115 is connected with non-inverting input 112 via a feedback resistor R6. A resistor R7 is connected between inverting input 113 and signal ground. Output 117 of amplifier 115 is applied to an inverting input 119 of comparator 116. A non-inverting input 120 of comparator 116 is connected via resistor R8 with a voltage divider defined by resistors R9 and R10 connected in series between supply voltage Vc and signal ground. This provides a threshold voltage to the non-inverting input of comparator 116. Comparator 116 further includes feedback resistor R11 connected between its output 121 and its non-inverting input 120.

In control circuit 102, output 121 of comparator 116 is connected via a diode D2 and resistor R12 to the base of an output transistor T3. A pull-up resistor R13 extends between Va and a junction 122 between diode D2 and resistor R12.

Power supply 103 (FIG. 9B) receives direct current power via a battery terminal 125 and signal ground 126. Diode D3 and resistor R14 are connected in series between battery terminal 125 and a transistor T4. Diode D3 protects power supply 103 against a negative voltage polarity at terminal 125. A supply voltage Va is provided at a junction 127 between a resistor R14 and transistor T4. Supply voltage Va is limited by zener diode D4 connected between terminal 127 and signal ground. Zener diode D4 will limit the voltage at terminal 127 to the reverse breakdown voltage of diode D5. A resistor R15 is connected between base 128 of transistor T4 and junction 127. A supply voltage Vb is provided at a junction 130 between an output terminal 129 of transistor T4 and a capacitor C1. Capacitor C1 connects terminal 129 to signal ground and provides smoothing of voltage Vb. A voltage regulator 132 receives supply voltage Vb as its input and supplies a regulated 5 Volt output Vc at terminal 133. A capacitor C2 is provided between terminal 133 and signal ground to reduce voltage ripple on terminal 133. An oscillator 135 and an output driver T5 are powered from the battery side of transistor T4 whereas the remainder of circuit 100 is powered by supply voltages Vb and Vc.

Supply circuit 103 further includes oscillator 135 defined by resistors R16, R17, R18, R19, a capacitor C3, and an operational amplifier 134. An output 136 of oscillator 134 is connected through a diode D5 and a resistor R20 to base 128 of transistor T4 for causing transistor T4 to be pulsed on and off. On/off pulsing of transistor T4 causes supply voltages Vb and Vc to be intermittent. This reduces the average power consumption of circuit 100.

Voltage regulator 132 is illustrated in FIG. 8C. The regulator includes resistors R21 and R22 connected in series between its output Vc and signal ground to provide a reference voltage, which represents the level of supply voltage Vc, to a control input 140 of a controlled diode D6. Diode D6 is connected between the base of transistor T6 and ground. A resistor R23 and a capacitor C4 are connected between supply voltage Vb and signal ground. The junction of resistor R23 and capacitor C4 is connected to a junction 141 of the cathode of diode D15 and the base 142 of transistor T6 to supply a drive signal to base 142. When the reference voltage provided to terminal 140 indicates Vc is above approximately 2.5 Volts, diode D6 will decrease the base drive signal. When the reference voltage at terminal 140 indicates the reference voltage at terminal 140 is above 2.5 Volts, diode D6 will increase the base drive signal.

Circuit 100 further includes a voltage doubler 104 which includes an oscillator 142 which generates a pulse signal output 144. Oscillator 142 is defined by an operational amplifier 143, resistors R24, R25, R26, R27, and a capacitor C5. Output 144 is provided to a capacitor/diode network, including capacitors C6 and C7 and diodes D7 and D8, which produces a DC voltage at 145 which is approximately twice the output voltage 144 of oscillator L 142. Such voltage doubler is conventional and its operation is known to those of ordinary skill in the art.

Output 145 of voltage doubler 142 is applied as the drive signal to the gate of an N-channel FET T5, via resistors R28 and R30, which is part of an output driver 105 capable of providing an output voltage of approximately 24 volts Output driver 105 further includes voltage protection diodes D9 and D10. Diode D9 is a 27 Volt zener connected from the drain to the gate of FET T5 in order to protect against load dumps and transients. Diode D10 is an 18 volt zener connected from the source to the gate of FET T3 in order to protect against reverse voltage potentials. Drive circuit 105 further includes a reverse voltage protection network 147 including a diode D6 and resistor a R29.

Circuit operates as follows. The signals established at outputs 110 (FIG. 9A) and 111 by internal detector 47 and external detector 48 are compared by differential amplifier 115. The signal on output 117 of amplifier 115 is a function of the difference between the inputs. When brake pedal 21 is being pressed, the output from comparator 115 is greater than the threshold applied to non-inverting input 119 of comparator 116 and output 121 of comparator 116 is switched low which pulls base 118 of transistor T3 low. With transistor T3 turned off, the gate drive signal at 149 can increase to a positive level established by voltage doubler 104. Transistor T5 may then provide an output voltage of approximately 24 Volts. When output 121 is switched low, a diode D12 will be biased on which will hold transistor T4 on to override the intermittent pulses supplied by oscillator 136. Thus, during detected brake actuation, the supply voltages Vb and Vc are constant and not intermittent. When the brake pedal is not pressed with sufficient force to drive output 121 low, transistor T3 is held on by voltage Va applied via resistors R12 and R13 to hold driver T5 off.

In the illustrated embodiment, circuit 100 includes an optional additional output 106 (FIG. 9A). Output 17 of amplifier 115 is applied to an inverting input 152 of a comparator 155. A non-inverting input 153 of comparator 55 is connected via resistor R33 with a voltage divider defined by resistors R31 and R32 connected in series between supply voltage Vc and signal ground. This provides a threshold voltage to non-inverting input 153. Comparator 155 further includes feedback resistor R34 connected between its output 154 and its non-inverting input 153.

The threshold applied to the non-inverting input 153 of comparator 155 can be greater than or less than the threshold applied to input 120 of comparator 116. The threshold applied to comparator 116 is selected depending upon the output 30 through 35 to be driven by output circuit 106. When the force applied to brake pedal 21 causes output 117 to exceed the threshold level applied to input 153, output 154 will be driven low. This will provide a drive signal to another one of the output devices 30 through 35 that the brake pedal has been actuated. When output 154 is low, a diode D13 will be biased on, which will hold transistor T4 on to override the intermittent pulses supplied by oscillator 136. Thus, during detected brake actuation, the supply voltages Vb and Vc are constant and not intermittent.

Additional outputs (not shown) similar to 106 may be provided for actuating output devices 30 through 35. These additional outputs may be provided by additional comparators having a first input coupled to output 117 of amplifier 115, a second input coupled to a respective threshold input, and an output coupled to transistor T4 via a diode. By applying different threshold levels to the each such additional comparator, circuit 100 can be made to respond to the amount of brake force applied to brake pedal 21. Accordingly, as the force applied to the brake pedal is increased, the number of outputs receiving an indication of brake pedal actuation will increase.

Temperature compensation is provided by using two optical detectors T1 and T2. Detector T1 provides a reference and detector T2 provides an output dependent upon the position of shutter 55. Both sensors operate in the same environment so that the transistors are similarly effected by temperature. Accordingly, the difference between the outputs of the sensing transistors as indicated at output 117 of differential amplifier 115 will be relatively unaffected by temperature.

In one example of the circuit, the following values were provided for the elements of the oscillator, the voltage doubler, the power supply, and the voltage regulator:

| | | | | | |
|---|---|---|---|---|---|
| C3 | 0.1 uF | 100 V. | C5 | 0.1 uF | 100 V. |
| R4 | 1.8M Ohms | | C6 | 0.1 uF | 100 V. |
| R3 | 100K Ohms | | R8 | 100K Ohms | |
| R5 | 100K Ohms | | R9 | 100K Ohms | |
| R6 | 100K Ohms | | R10 | 1M Ohms | |
| R7 | 100K Ohms | | C4 | 0.001 uF | 100 V. |
| R34 | 100K Ohms | | R35 | 100K Ohms | |
| C7 | 0.01 uF | 100 V. | R1 | 100K Ohms | |
| R2 | 10K Ohms | | C1 | 0.1 uF | |
| C2 | 10 uF | | R33 | 620 Ohms | |

Figure 9B:
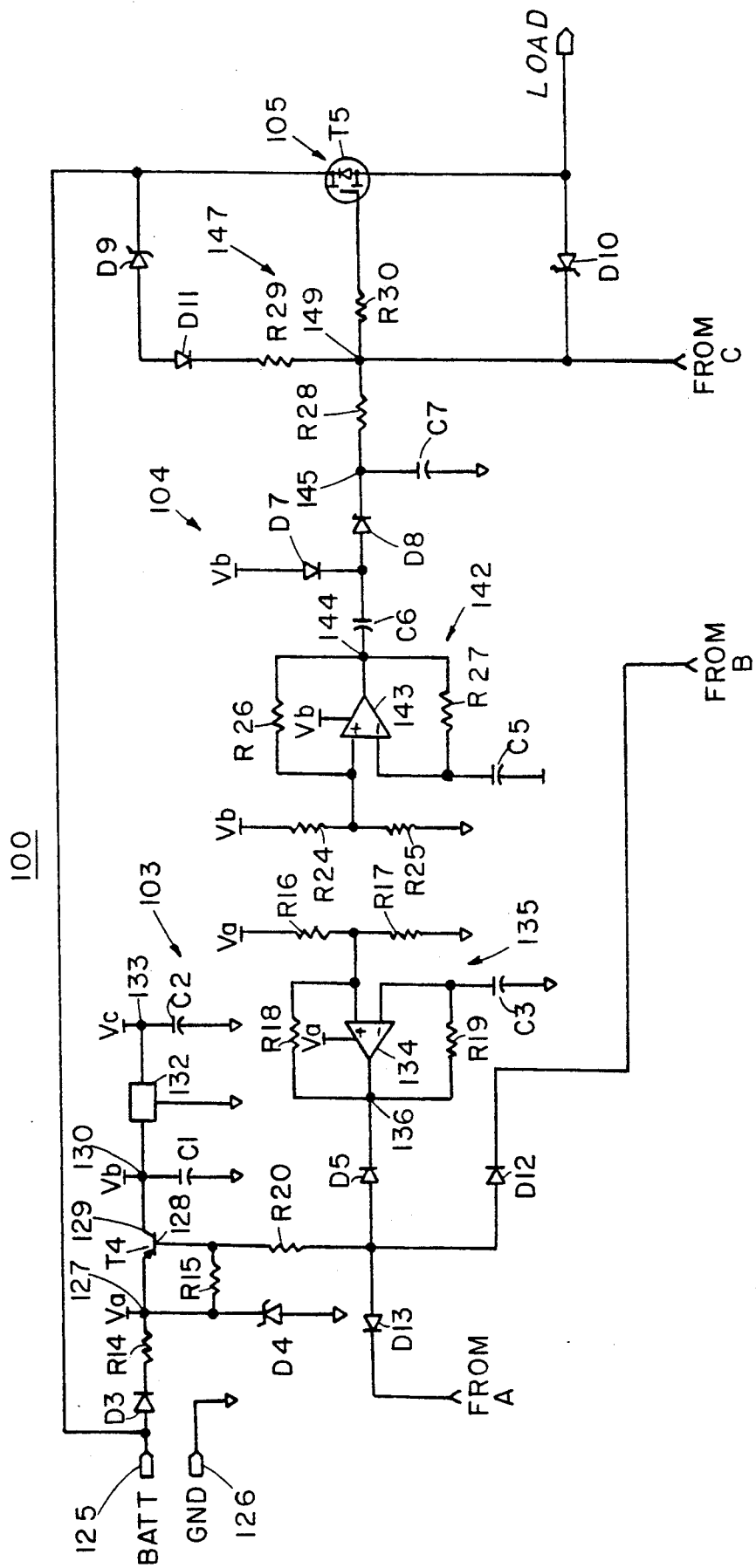

Circuit 100 as illustrated in FIGS. 9A, 9B, and 9C and described above is responsive to output signals from the embodiment of sensor assembly 26 illustrated in FIGS. 2 through 4 Those of ordinary skill in the art will recognize that circuit 100 requires minor modifications to be responsive to output signals from the embodiment of sensor assembly 26 illustrated in FIGS. 6 through 8 When used with the embodiment illustrated in FIGS. 2 through 4, the output signal on output 117 (FIG. 9A) of differential amplifier 115 will increase with increasing force applied to the brake pedal. When used with the embodiment of FIGS. 6 through 8, the output signal 117 will decrease with increasing force applied to the brake pedal. Circuit 100 will therefore merely require a logic inversion for the outputs of the comparators receiving the output signal from amplifier 117. The circuit modifications to circuit 100 are therefor well within the level of skill of the ordinary artisan, and will not be described in greater detail.

Changes and modifications in the specifically disclosed embodiments can be carried out without departing from the principles of the invention which is intended to be limited only by the scope of the appended claims, as including the doctrine of equivalents.

The embodiments of the invention in which an exclusive property or privilege is claimed are defined as follows:

1. A force sensitive sensor for a vehicle brake pedal assembly including a brake pedal, comprising:
   an optical coupler carried in said vehicle brake pedal assembly, said optical coupler including first and second members and means defining an optical coupling between said members which varies proportional to a force applied to said brake pedal;
   wherein said optical coupler generates an optical coupler output signal responsive to said optical coupling so that said output signal is proportional to said force applied to said brake pedal.

2. A sensor according to claim 1, further including a shutter imposed between said first and second members which interrupts said optical coupling according to said force applied to said brake pedal.

3. A sensor according to claim 1, further including a means for mounting a shutter to said brake pedal assembly and a means for mounting said optical coupler to said brake pedal assembly.

4. A sensor according to claim 3, wherein said means for mounting said shutter is a bearing in said vehicle brake pedal assembly and said means for mounting said optical coupler is a housing in said brake pedal assembly.

5. A sensor according to claim 3, further including a controller receiving said output signal of said optical coupler and generating a controller output signal responsive to said optical coupler output signal, and a driver generating a driver output signal responsive to said controller output signal.

6. A sensor according to claim 3, wherein said brake pedal assembly includes a push-rod pin and one of said means for mounting said shutter and said means for mounting said optical coupler is carried by said push-rod pin.

7. A sensor according to claim 6, wherein said brake pedal assembly includes a push-rod operatively connected to said push-rod pin, wherein the other one of said means for mounting said shutter and said means for mounting said optical coupler is carried by said push-rod.

8. A sensor according of claim 3, further including means for carrying said optical coupler and means for translating the force applied to the brake pedal into a distance of relative movement, said means for an slating carried between said means for mounting said shutter and said means for mounting said optical coupler.

9. A sensor according to claim 8 wherein said means for translating includes a compressible pad.

10. A vehicle brake pedal actuation indicator comprising:
    an optical coupler carried in a vehicle brake pedal assembly and generating an optical coupler output signal which provides an indication of vehicle brake pedal actuation, said optical coupler output signal proportional to a once applied to a vehicle brake pedal of said vehicle brake pedal assembly;
    a controller coupled to said optical coupler to receive said optical coupler output signal and generating a controller output signal in response to said optical coupler output signal; and
    a driver providing a circuit output in response to said controller output signal.

11. An indicator according to claim 10, further including a source of power which includes an oscillator and a switch, said switch being operative to selectively connect power to said optical coupler and said controller, said oscillator controlling said switch whereby said power from said source of power is supplied to said optical coupler and said controller intermittently.

12. An indicator according to claim 10, wherein said controller comprises first means for comparing said optical coupler output signal with a first reference, a second means for comparing an output of said first means for comparing with a second reference, and a transistor receiving an output of said second means for comparing.

13. An indicator according to claim 10 wherein said optical coupler provides an infrared coupling.

14. An indicator according to claim 10, wherein:
    said controller includes first means or comparing said optical coupler output signal with a first reference to provide an output signal that is a function of the difference between said optical coupler output signal and said first reference, a second means for comparing said output signal of said first means for comparing to a second reference, and a first transistor responsive to an output signal of said second means for comparing; and
    said driver comprises a second transistor connected to receive an output signal of a voltage doubler and connected to said first transistor;
    whereby said first transistor prevents said output of said voltage doubler from driving a gate of said second transistor unless brake pedal actuation is indicated by said second means for comparing.

15. An indicator according to claim 10, further including at least one comparing means for providing at least one additional circuit output in response to said optical coupler output signal.

16. An indicator according to claim 10, said optical coupler further including an emitter, a first sensor responsive to a signal emitted by said emitter, and a second sensor responsive to said signal emitted by said emitter, wherein one of said first and second sensors acts as a reference for temperature compensation.

17. An indicator according of claim 16 wherein at least one of said first and second sensors comprises a Darlington transistor.

18. An indicator according to claim 16, wherein said controller includes comparing means having respective inputs connected to said first and second sensors, said comparing means receiving at said respective inputs output signals form said first and second sensors.

19. An indicator according to claim 10, wherein said driver includes a transistor connected to an output of said controller.

20. An indicator according of claim 19, wherein a gate of said transistor is responsive to a voltage output from a voltage doubler.

21. A vehicle brake actuation indicator for a vehicle having a power source and a braking system including a brake pedal for actuating said braking system, comprising:
   brake actuation sensing circuitry responsive to movement of said vehicle brake pedal; and
   a power supply connected to said vehicle power source, said power supply outputting pulsed power to said brake actuation sensing circuitry whereby said actuation sensing circuitry receives power from said power supply intermittently.

22. An indicator according to claim 21, wherein said power supply further includes means responsive to a user actuating said vehicle brake pedal for outputting constant power to said sensing circuitry.

23. An indicator according to claim 21, wherein the power supply includes means for providing pulses and a switch connected to an electrical series connection with said brake actuation sensing circuitry, said switch controlled by said pulses outputting said pulsed power.

24. An indicator according of claim 23, wherein said switch comprises an input coupled to a battery, an input coupled to receive said unless and an output, said means for providing pulses connected to receive power from said battery, and said actuation sensing circuitry is coupled to said output of said switch.

25. An indicator according to claim 23 wherein said brake actuation sensing circuitry includes an optical coupler which is coupled to an output of said switch.

26. A sensor for detecting brake pedal actuation in a vehicle having a brake pedal, a braking system and a member that is movable to actuate the braking system, said sensor comprising:
   an optical coupler carried by a housing which receives a bearing;
   a means for translating a force applied to the brake pedal into a relative distance between said housing and said bearing; and
   wherein said optical coupler generates an optical coupler output signal proportional to said relative distance between said housing and said bearing.

27. A sensor according to claim 26, wherein power is supplied to said optical coupler intermittently.

28. A sensor according to claim 26 wherein one of said housing and said bearing is connected with said brake pedal and the other one of said housing and said bearing is connected with said member.

29. A sensor according to claim 26, wherein a shutter is carried by said bearing, said shutter being positioned in order to interfere with an optical coupling according to said relative distance between said housing and said bearing.

30. A sensor according to claim 26, wherein said optical coupler includes first and second optical coupler detectors.

31. A sensor according to claim 30, further comprising means connected to said first and second optical coupler detectors for comparing respective output signals from said first and second optical coupler detectors.

32. A sensor according to claim 31, wherein power is supplied intermittently to said optical coupler and said means for comparing.

33. A vehicle brake actuation indicator comprising:
   an optical coupler generating an optical coupler output signal which provides an indication of actuation of a vehicle brake pedal, said output signal proportional to a force applied to said vehicle brake pedal;
   a comparing means coupled to said optical coupler for comparing said output signal of said optical coupler with a reference, said comparing means including an output; and
   means coupled to said output comparing means for providing at lest one circuit output signal in response to an output signal of said means for comparing.

34. An indicator according to claim 33, wherein said means for providing at least one circuit output signal includes a plurality of comparator circuits connected to said output of said comparing means and providing respective output signals responsive to said force applied to said vehicle brake pedal, and said output signal for each output comparator produced at a different threshold brake pedal force.

35. An indicator according to claim 33 wherein said means for providing at least one output signal includes a second comparing means for comparing an output of said first means or comparing with a second reference.

36. a force sensor for a vehicle brake system, comprising;
   a housing;
   a brake element;
   means for translating a force exerted on one of said housing and said brake element into a relative distance between said housing and said brake element; and
   an optical coupler, said optical coupler including an optical coupler source coupled to an optical coupler sensor via an optical coupling, said optical sensor generating an output signal dependent upon said optical coupling and said optical coupling proportional to said distance between said housing and said brake element whereby said optical coupler generates an optical coupler output signal proportional to said force.

37. A sensor according to claim 36, further including a shutter which interrupts said optical coupling according to said relative distance between said housing and said brake element.

38. A sensor as defined in claim 36, wherein said brake element includes a pin operatively connected to said housing.

* * * * *

UNITED STATES PATENT AND TRADEMARK OFFICE
CERTIFICATE OF CORRECTION

PATENT NO. : 5,217,280
DATED : June 8, 1993
INVENTOR(S) : Todd M. Nykerk et al.

Page 1 of 2

It is certified that error appears in the above-indentified patent and that said Letters Patent is hereby corrected as shown below:

column 1, line 51: "t" should be --to--;

column 1, line 54: "an" should be --and--;

column 5, line 49: after "oscillator" delete "L";

column 5, line 56: after "volts" insert --.--;

column 6, line 20: "17" should be --117--;

column 6, line 23: "55" should be --155--;

column 7, line 37: after "as" insert --interpreted according to the principles of patent law--;

column 7, claim 1, lines 46 and 47: "proportional" should be --proportionally--;

column 8, claim 8, line 14: "of" should be --to--;

column 8, claim 8, line 17: "slating" should be --translating--;

column 8, claim 10, line 28: "once" should be --force--;

column 8, claim 14, line 53: "or" should be --for--;

column 9, claim 17, line 13: "of" should be --to--;

column 9, claim 18, line 20: "form" should be --from--;

column 9, claim 20, line 23: "of" should be --to--;

column 9, claim 24, line 46: "of" should be --to--;

column 9, claim 24, line 48: "unless" should be --pulses--;

UNITED STATES PATENT AND TRADEMARK OFFICE
CERTIFICATE OF CORRECTION

PATENT NO. : 5,217,280

DATED : June 8, 1993

INVENTOR(S) : Todd M. Nykerk et al.

It is certified that error appears in the above-indentified patent and that said Letters Patent is hereby corrected as shown below:

column 10, claim 33, line 32: "lest" should be --least--;
column 10, claim 35, line 46: "or" should be --for--.

Signed and Sealed this

Twenty-fourth Day of May, 1994

Attest:

BRUCE LEHMAN

Attesting Officer    Commissioner of Patents and Trademarks